United States Patent
Varoglu et al.

(10) Patent No.: US 9,173,061 B2
(45) Date of Patent: Oct. 27, 2015

(54) MONITORING A MOBILE DEVICE EN ROUTE TO DESTINATION

(71) Applicant: Apple Inc., Cupertino, CA (US)

(72) Inventors: Devrim Varoglu, Santa Clara, CA (US); Swapnil R. Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 13/717,566

(22) Filed: Dec. 17, 2012

(65) Prior Publication Data

US 2014/0171013 A1    Jun. 19, 2014

(51) Int. Cl.
  *H04W 4/02*  (2009.01)
  *H04W 4/22*  (2009.01)
(52) U.S. Cl.
  CPC ............... *H04W 4/021* (2013.01); *H04W 4/22* (2013.01)
(58) Field of Classification Search
  CPC .................................................... H04W 4/021
  See application file for complete search history.

(56) References Cited

U.S. PATENT DOCUMENTS

| 8,831,635 B2 * | 9/2014 | Haney | 455/456.2 |
| 2003/0060212 A1 * | 3/2003 | Thomas | 455/456 |
| 2004/0243664 A1 * | 12/2004 | Horstemeyer | 709/200 |
| 2008/0162034 A1 | 7/2008 | Breen | |
| 2009/0197617 A1 * | 8/2009 | Jayanthi | 455/456.2 |

FOREIGN PATENT DOCUMENTS

CA    WO2008/049202    *    5/2008

* cited by examiner

*Primary Examiner* — Quan M Hua
(74) *Attorney, Agent, or Firm* — Fish & Richardson P.C.

(57) ABSTRACT

A system, method and apparatus are disclosed for monitoring a mobile device en route to a destination. A user of a monitored device specifies geo-fence regions along a route to the destination. Entry and exit of regions triggers the sending of event notifications to a monitoring device. Event notifications may be sent if an estimated time of arrival changes due to delay. Event notifications may be sent if the monitored device deviates from a planned route by a threshold distance. Event notifications may be sent through a direct communication link between the monitored device and monitoring device or through a location-based service.

20 Claims, 7 Drawing Sheets

MONITORING A MOBILE DEVICE EN ROUTE TO DESTINATION

TECHNICAL FIELD

This disclosure relates generally to location-based services for mobile devices.

BACKGROUND

Most people have experienced the anxiety of waiting for a loved one to arrive safely at a destination. Typically, one knows the departure time, destination and estimated time of arrival of a traveler. When the traveler arrives safely at the destination, contact is made through telephone, e-mail or text messaging to confirm safe arrival.

There are instances, however, where a traveler's estimated time of arrival is delayed due to traffic, severe weather, flat tire or some other event. If the traveler is traveling on an airplane, a flight tracker application may be used to determine when their plane is estimated to arrive at a destination airport. If the traveler is traveling in a car, train, boat, bus or on foot, there is often no convenient way to know whether the traveler will be delayed or is in need of assistance without the traveler initiating contact or without the concerned individual making many phone calls to track down the traveler's whereabouts.

SUMMARY

A system, method and apparatus are disclosed for monitoring a mobile device en route to a destination. A user of a monitored device specifies geo-fence regions along a route to the destination. Entry and exit of regions triggers the sending of event notifications to a monitoring device. Event notifications may be sent if an estimated time of arrival changes due to delay. Event notifications may be sent if the monitored device deviates from a planned route by a threshold distance. Event notifications may be sent through a direct communication link between the monitored device and monitoring device or through a location-based service.

In some implementations, a method comprises: receiving, at a first device, input specifying a route with a departure location, a destination location and one or more intermediate locations; receiving, at the first device, input specifying regions around the departure location, the destination location and the one or more intermediate locations; receiving a request to allow monitoring of the first device by a second device; sending an acceptance of the request to the second device; detecting, at the first device, an entry or exit event of the first device into or out of a specified region; and sending a notification to the second device in response to the detecting.

In some implementations, a method comprises: sending, from a first device, a request to monitor a second device while the second device is en route to a destination; receiving, at the first device, acceptance of the request; receiving a first event notification that the second device has exited a departure region; automatically initiating monitoring of the second device in response to the event notification; and receiving, during monitoring, a second event notification indicating that the second device has entered or exited an intermediate region or a destination region.

Particular implementations disclosed herein provide one or more of the following advantages. A user may monitor the travel of an individual and receive notifications automatically when the individual is delayed or in need of assistance.

Other implementations are disclosed for systems, methods and apparatus. The details of the disclosed implementations are set forth in the accompanying drawings and the description below. Other features, objects, and advantages will be apparent from the description and drawings and from the claims.

DESCRIPTION OF DRAWINGS

The same reference symbol used in various drawings indicates like elements.

DETAILED DESCRIPTION

Example System

Figure 1:
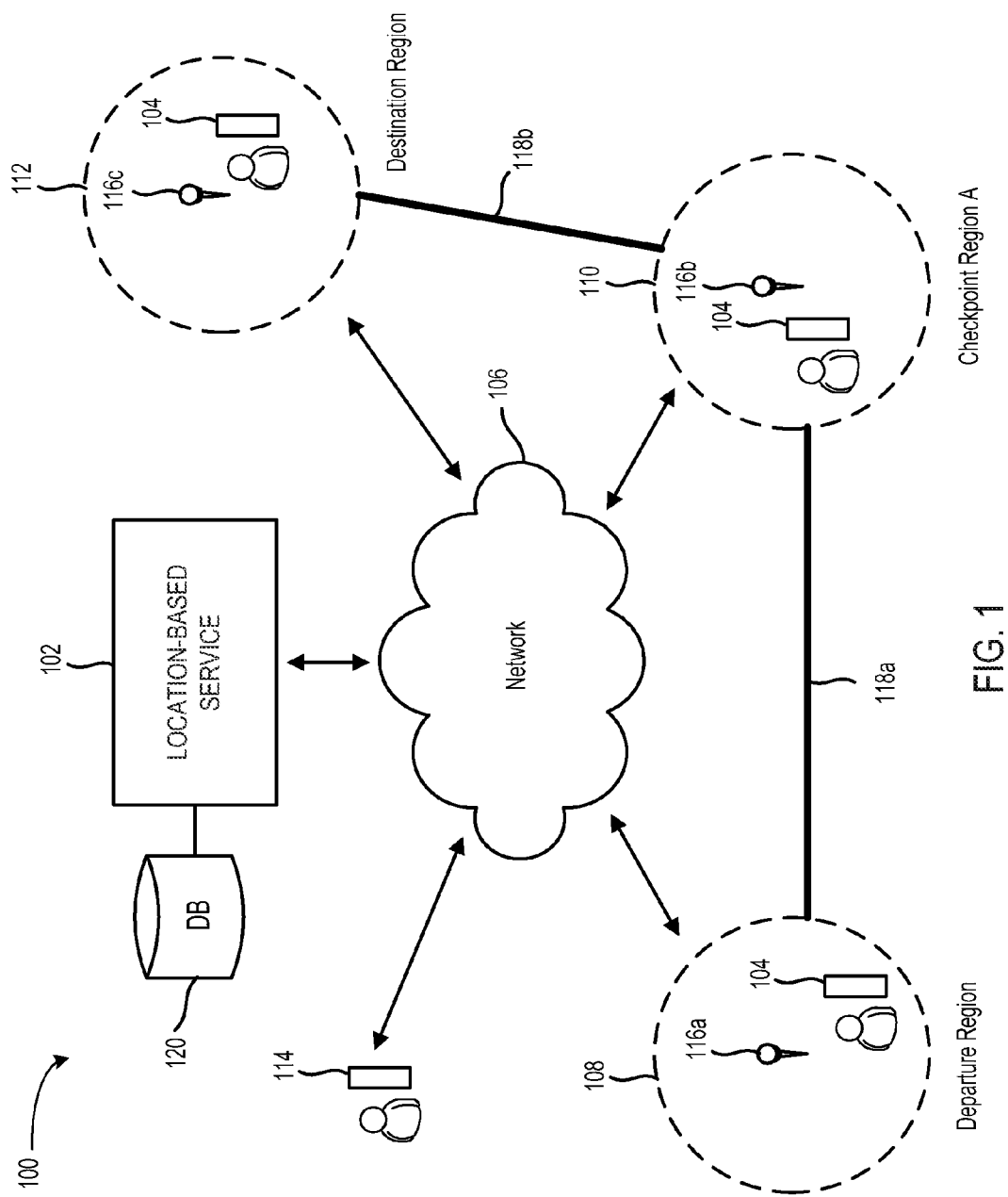
FIG. 1 is a block diagram of an example system for monitoring a mobile device en route to a destination.

FIG. 1 is a block diagram of an example system 100 for monitoring a mobile device en route to destination. In some implementations, system 100 may include location-based service (LBS) 102, monitored device 104, network 106, departure region 108, checkpoint region 110 ("Checkpoint A"), destination region 112 and monitoring device 114.

Departure region 108 is defined by a geo-fence surrounding geographic location 116a, which in this example is a home of the user operating monitored device 104. Checkpoint region 110 is defined by a geo-fence surrounding geographic location 116b, which in this example is a departure train station. Destination region 112 is defined by a geo-fence surrounding geographic location 116c, which in this example is a destination train station. Geographic locations may be any desired location along a route, including homes, offices, points of interest, bus stations, train stations, airport terminals, boat docks, businesses, etc. A route may include one or more route segments traversing land, air, sea or other water way.

In the example shown, a user carrying monitored device 104 is travelling from geographic location 116a by car along route segment 118a (e.g., a highway) to departure train station 116b, and then by train along route segment 118b to destination train station 116c. Monitored device 104 can be any location-aware device capable of communicating with other devices, including but not limited to smart phones, electronic tablets and personal computers. Monitored device 104 may include one or more processors configured to monitor the entry and exit of regions 108, 110, 112 based on data from onboard positioning systems, such as Global Navigation Satellite Systems (GNSS), such as Global Positioning System (GPS), wireless positioning systems (e.g., Wi-Fi, 3G, 4G) and cellular positioning systems (e.g., cell ID).

In the example shown, when monitored device 104 exits departure region 108 a timestamp is generated by monitored device 104 and stored on monitored device 104 (e.g., in memory) and/or in database 120 accessible by LBS 102. Monitored device 104 may include an internal clock or timer configured to generate the timestamp. An estimated time of arrival (ETA) may be calculated by monitored device 104 for checkpoint region 110. The ETA may be calculated based on the departure time, distance to checkpoint region 110, travel speed and traffic information. Travel speed and direction may be determined using sensor data from sensors (e.g., accelerometers, gyros, magnetometer) embedded in or coupled to monitored device 104. In some implementations, ETA may be calculated by a vehicle navigation system (e.g., portable or built-in car navigation system) and shared with monitored device 104 through a wireless (e.g., Bluetooth connection) or wired connection. Traffic information may be provided by a server computer in LBS 102 or by an independent traffic monitoring service. The ETA may be stored on monitored device 104 or database 120.

When monitored device 104 enters or exits checkpoint region 110 a timestamp is generated by monitored device 104 and stored on monitored device 104 and/or in database 120. In addition, monitored device 104 may also compute a dwell time, by subtracting the entry timestamp from the exit timestamp for checkpoint region 110.

Upon exit of checkpoint region 110, an ETA at destination region 112 is calculated and stored on monitored device 104 or database 120. In this example, since the transportation mode is a train and route 118b is a train track, the ETA may be calculated from a train departure/arrival schedule and any known delay information. In some implementations, sensor data from sensors onboard monitored device 104 can be used to calculated or update the ETA. When monitored device 104 enters destination region 112, an arrival timestamp is computed and stored on monitored device 104 and/or database 120.

In the example shown, a user monitors the progress of monitored device 104 using monitoring device 114. As described in reference to FIGS. 2A and 2B, monitoring device 114 can send a route-sharing request to monitored device 104. If the user of monitored device 104 accepts the request (e.g., user accepts through a user interface), monitoring device 114 will receive event notifications from monitored device 104 as monitored device traverses route segments 118a, 118b and enters and exits regions 108, 110, 112. Event notifications may be any event that provides information regarding the status of monitored device while traveling en route, including any deviations from the planned route segments by a threshold distance, delays or change in device behavior. Some examples of status may include, but are not limited to, notifications when the monitored device has entered or exited a geo-fence region and the corresponding entry or exit timestamps, ETA updates, dwell times exceeding maximum or minimum thresholds, sensor readings indicating a deviation (e.g., change in location, speed or direction) from the planned route or change in mode of transportation, a lost communication link with the monitored device, calls made to emergency services, etc.

The user of monitoring device 114 may begin monitoring of monitored device 104 by entering a monitoring mode manually through a user interface presented on a display of monitoring device 114 provided by a software application, operating system or web service. In some implementations, monitoring may be initiated using a voice command and speech recognition technology implemented on monitoring device 114. In some implementations, monitoring may be initiated automatically after receiving a departure notification from monitored device 104. In this latter scenario, the user of monitoring device 114 can request route sharing and the request may be kept pending until accepted by the user of monitored device 104. Thus, there is a pre-negotiation between monitoring device 114 and monitored device 104 prior to the monitored device 104 embarking en route to the destination. On a specified day and time of departure, a notification may be sent from monitored device 104 to monitoring device 114 when monitored device 104 exits departure region 108. The monitoring remains active until terminated by the users of devices 104, 114 or until the destination 116c is reached, which can be indicated by notification of an entry of monitored device 104 into destination region 112.

Notifications may include a map or map data for generating a map on monitoring device 114 using a mapping application installed on monitoring device 114. The map can be displayed on monitoring device 114 and show through suitable visual markers regions 108, 110 112, route segments connecting regions, traffic information (e.g., color coded and overlaid on route segments) and the current location of monitored device 104. In some implementations, notifications may include dwell times (e.g., to indicate delays), alerts for unexplained change in location or direction (e.g., may indicate an alternate route taken due to an accident), speed (e.g., may indicate new mode of transportation or an accident blocking route) and any calls placed on monitored device 104 to emergency services. In some implementations, a click-to-call link to the monitored device 104 can be presented on monitoring device 114 to allow the user of monitoring device 114 to call monitored device 104 directly without searching through a call directory or contacts database for a number. Notifications can be presented on monitoring device 114 as a graphic, animation, audio, text or force feedback (e.g., vibration).

Example User Interfaces

Figure 2A:
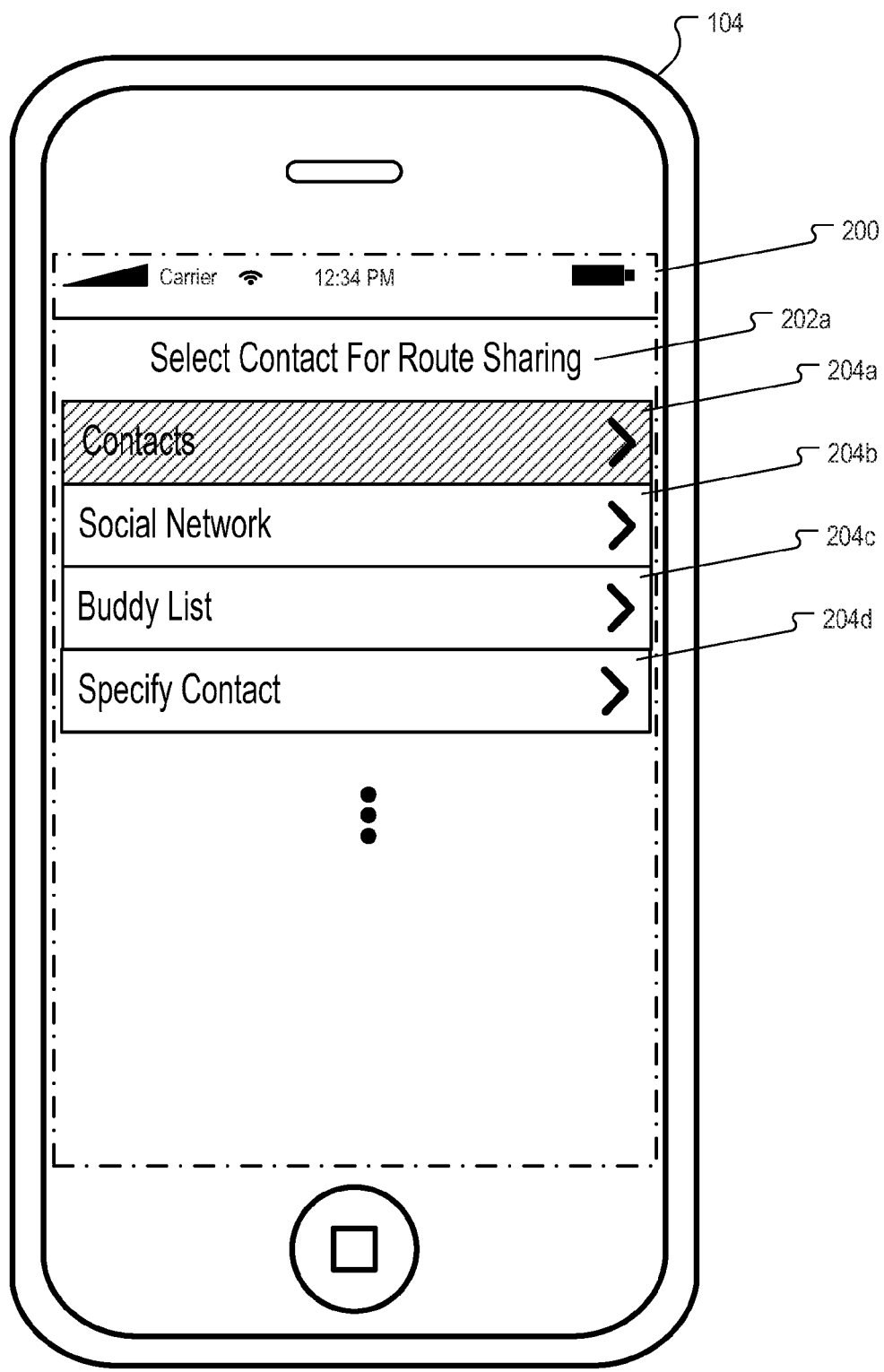
FIG. 2A is an example user interface illustrating the selection of a contact source.

FIG. 2A is an example user interface illustrating the selection of a contact source. In some implementations, monitoring device 114 displays user interface 202a on display 200 of monitoring device 114. In the example shown, display 200 is a touch sensitive surface capable of receiving touch inputs and gestures. Other display surfaces may also be used. Voice commands may also be used.

User interface 202a includes elements 204a-204d representing options for selecting contact sources. These contact sources include but are not limited to contact databases, social networks, buddy lists and manual specification of a contact. A contact is an individual that is to be tracked. In the example shown, element 204a is selected allowing the user to select a contact from a contact database on or accessible through monitoring device 114.

Figure 2B:
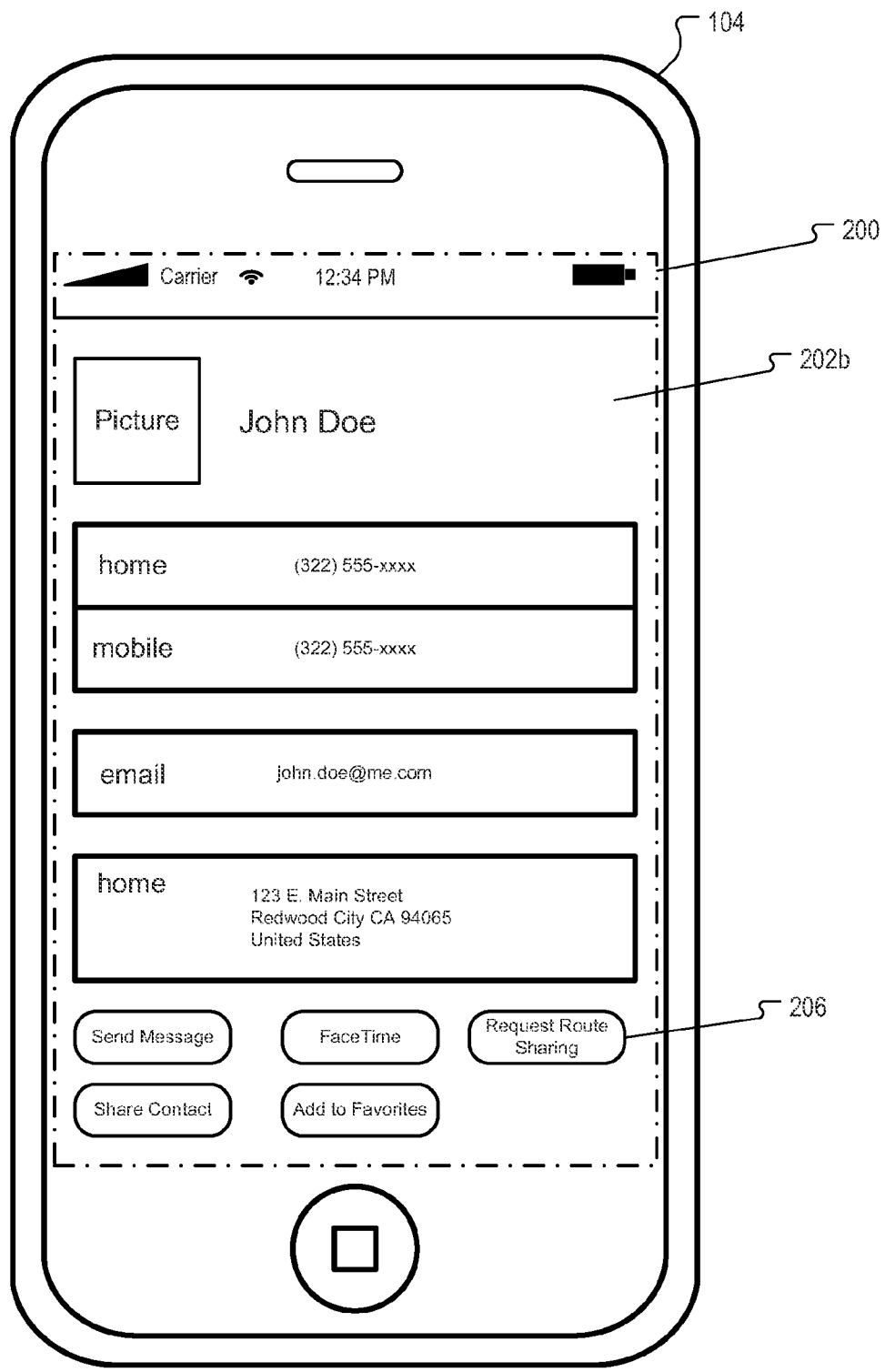
FIG. 2B is an example user interface illustrating the selection of a contact from the selected contact source.

FIG. 2B is an example user interface 202b illustrating a contact selected from the selected contact source. In this example, the user has request route sharing with the device (e.g., a mobile phone) identified by mobile number (322) 555-xxxx using element 206 (e.g., a virtual button).

When the user touches element 206, a request message is sent to monitored device 104 and may be presented to the user in a user interface, text message, e-mail or any other suitable mode of communication. The request may be kept pending for a predetermined amount of time. The request message may include the name and mobile number of the requestor. The request may be accepted by the user of monitored device 104, or programmatically, by an application or operating system running on monitored device 104. After acceptance of the request, monitored device 104 waits for the date and time of departure to arrive (e.g., through a system clock or calendar event), and within a predetermined amount of time after the time of departure waits for a geo-fence exit event to be detected. When the exit event is detected (e.g., by a hardware processor), a departure event notification is sent to monitoring device 114, which starts the monitoring process on monitoring device 114.

Figure 3:
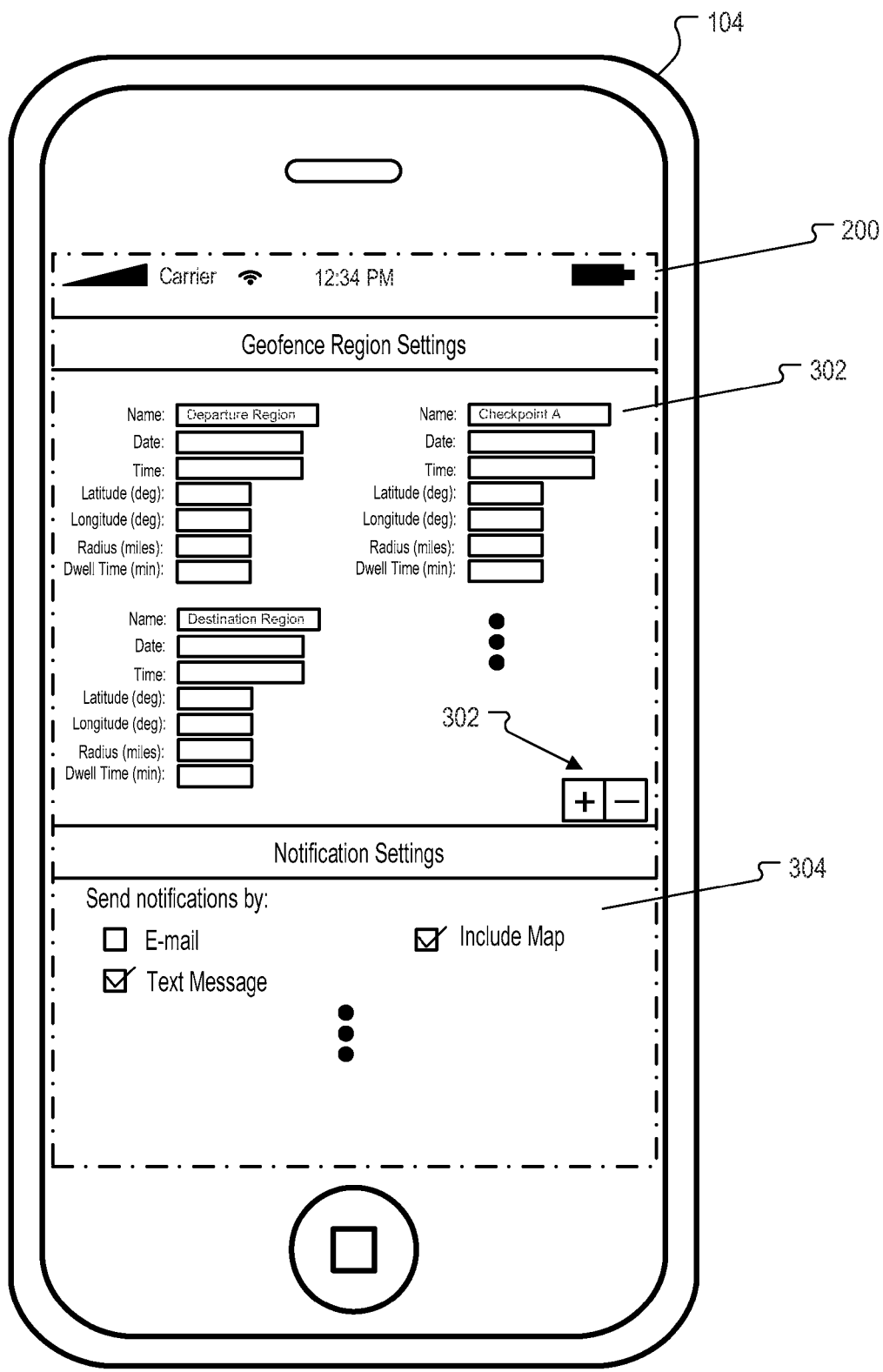
FIG. 3 is an example user interface illustrating geo-fence region and notification settings.

FIG. 3 is an example user interface illustrating geo-fence region and notification settings. In some implementations, monitored device 104 presents user interface 302 on touch sensitive display 200. User interface 302 includes two portions. A first portion 302 allows a user to specify geo-fenced region settings and a second portion 304 allows a user to specify notification settings.

As shown in FIG. 3, the user of monitored device 104 can set a number of geo-fence parameters. These parameters include Name, Date, Time, Latitude, Longitude, Radius and Dwell Time. The Name field is used to name the geo-fence region. In this example, the user has specified names in Name fields for three geo-fence regions: Departure, Checkpoint A and Destination. The Date and Time fields are used to specify when monitored device 104 is expected to enter the region. The latitude and longitude fields allow the user to specify geographic locations 116a, 116b, 116c, which define the centers of the regions. The Radius field allows the user to specify the size of the geo-fence. The Dwell Time field allows the user to specify how long monitored device 104 is expected to stay in a given region. Adding the value in the Dwell Time field to the value in the Time field gives an expected maximum time of exit from the region. If this maximum time is exceeded, a new ETA is computed and a notification of the event is sent to monitoring device 114 along with the updated ETA.

The geo-fence region settings may be stored on monitored device 104 or in database 120. Controls 306 may be used to add or delete geo-fence regions. For example, selecting the "+" control adds a set of blank geo-fence settings fields and selecting the "−" control opens a list of geo-fence regions with a delete button that allows the user to delete geo-fence regions. The user can save geo-fence region settings to a route file that may be uploaded with other route data generated by a mapping or routing application to database 120 for sharing with other devices, such as monitoring device 114. In some implementations, user interface 302 may be a web page provided by a web server in LBS 102.

In portion 304, the user may specify (e.g., though check boxes) a mode of communication for event notifications (e.g., e-mail, text message, cellular), and whether to include a map or map data, as previously described in reference to FIG. 1. Other settings are also possible. For example, date and time range fields may be provided for specifying a date and time range when notifications are sent to prevent false triggers at times when no monitoring is requested.

Example Processes

Figure 4:
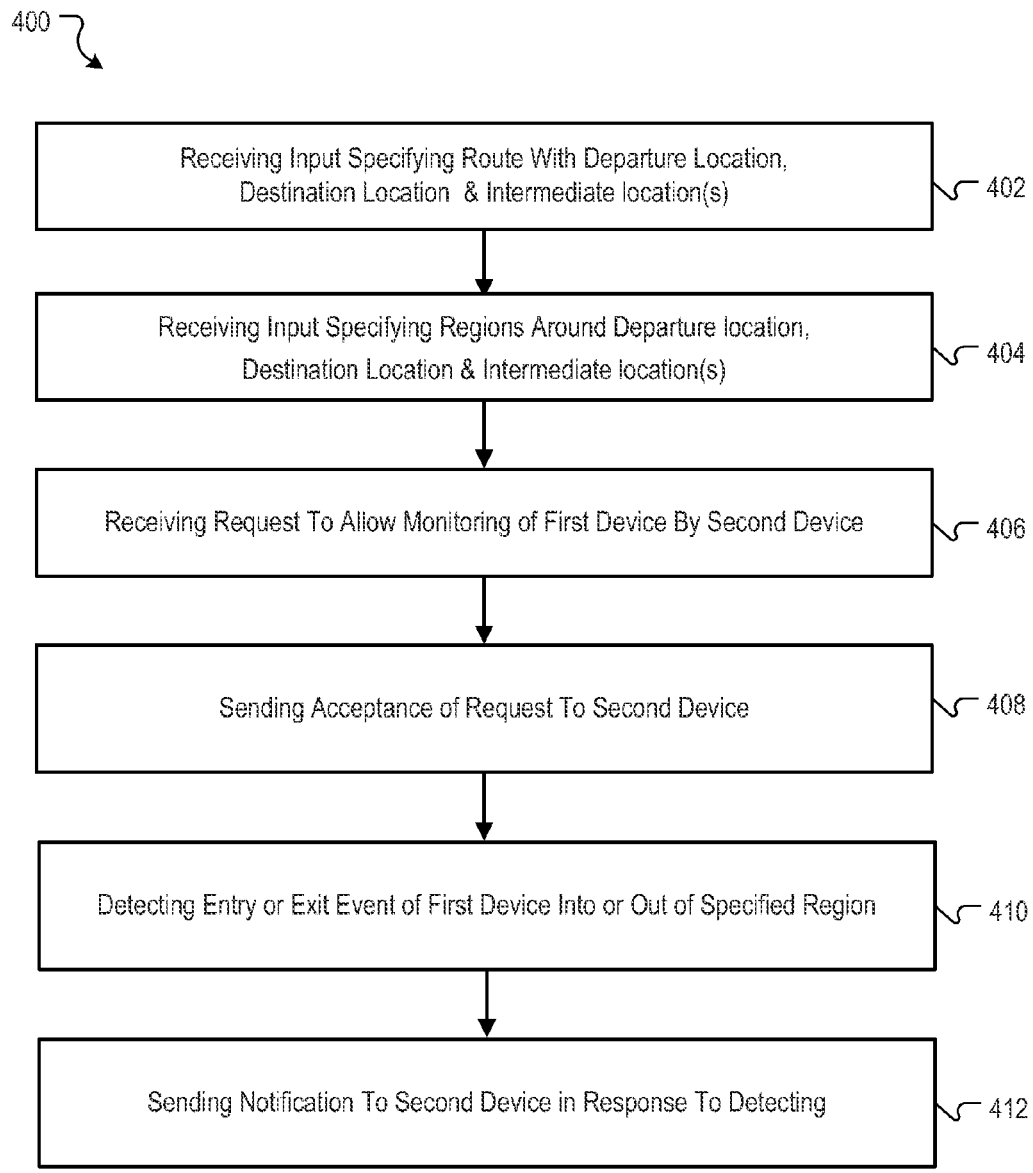
FIG. 4 is a flow diagram of an example process of monitoring a mobile device en route to a destination.

FIG. 4 is a flow diagram of an example process 400 of monitoring a mobile device en route to a destination. In some implementations, process 400 may be implemented using architecture 600, as described in reference to FIG. 6.

In some implementations, process 400 may begin by receiving, at a first device, input specifying a route with a departure location, a destination location and one or more intermediate locations (402). An example user interface for implementing this step is shown in FIG. 3. Process 400 may continue by receiving a request to allow monitoring of the first device by a second device (404) and sending an acceptance of the request to the second device (406). An example user interface for sending a request from a monitoring device is shown in FIG. 2B. During monitoring, process 400 may continue by detecting, at the first device, an entry or exit event of the first device into or out of a specified region (408) and sending an event notification to the second device in response to the detecting (410). The event notifications may be sent by any suitable mode of communication, such as e-mail, text message or cellular network.

Figure 5:
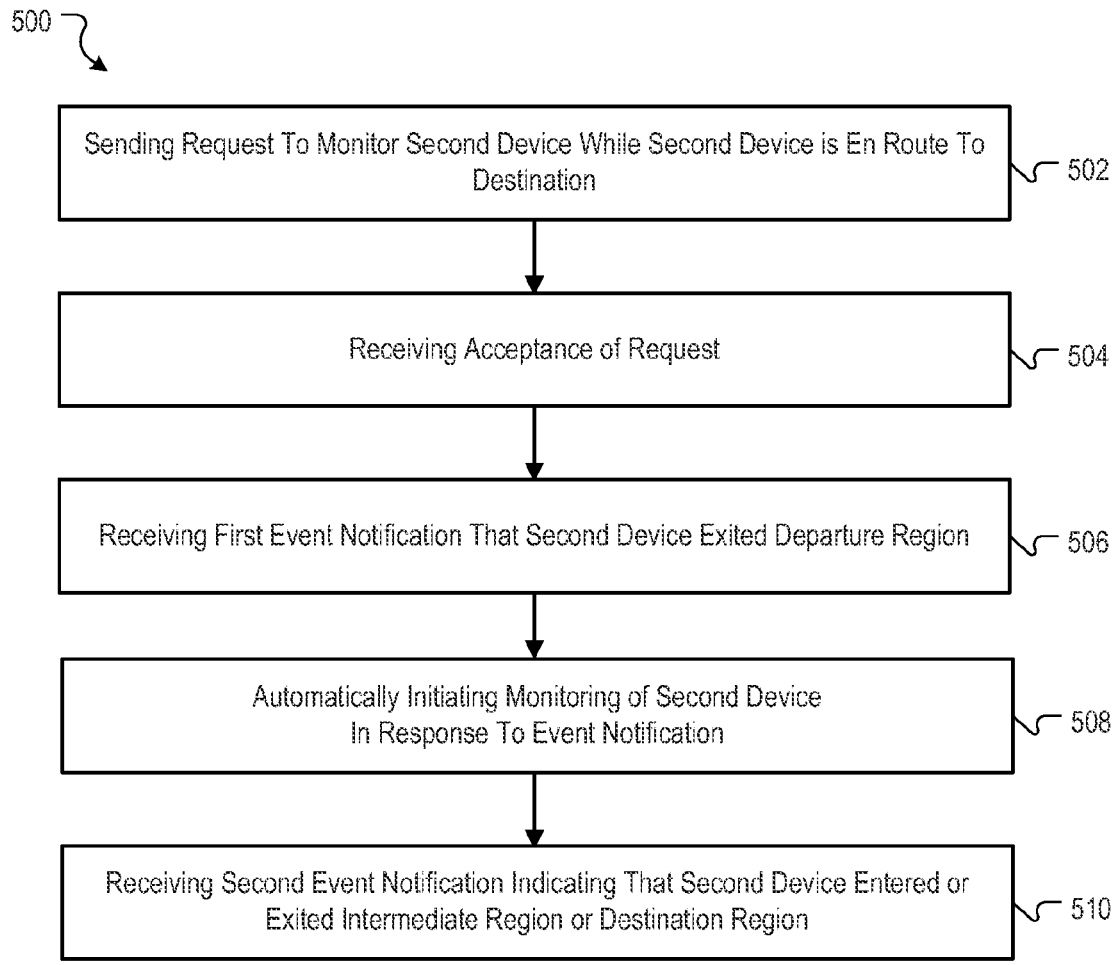
FIG. 5 is a flow diagram of an example process of initiating monitoring in response to departure event.

FIG. 5 is a flow diagram of an example process 500 of automatically initiating monitoring in response to a departure event. In some implementations, process 500 may be implemented using architecture 600, as described in reference to FIG. 6.

In some implementations, process 500 may begin by sending from a first device a request to monitor a second device while the second device is en route to a destination (502). Process 500 may continue by receiving, at the first device acceptance of the request (504). Process 500 may continue by receiving a first event notification that the second device has exited a departure region (506), and automatically initiating monitoring of the second device in response to the event notification (508). Process 500 may continue by receiving, during monitoring, a second event notification indicating that the second device has entered or exited an intermediate region or a destination region (510).

Example Device Architecture

Figure 6:
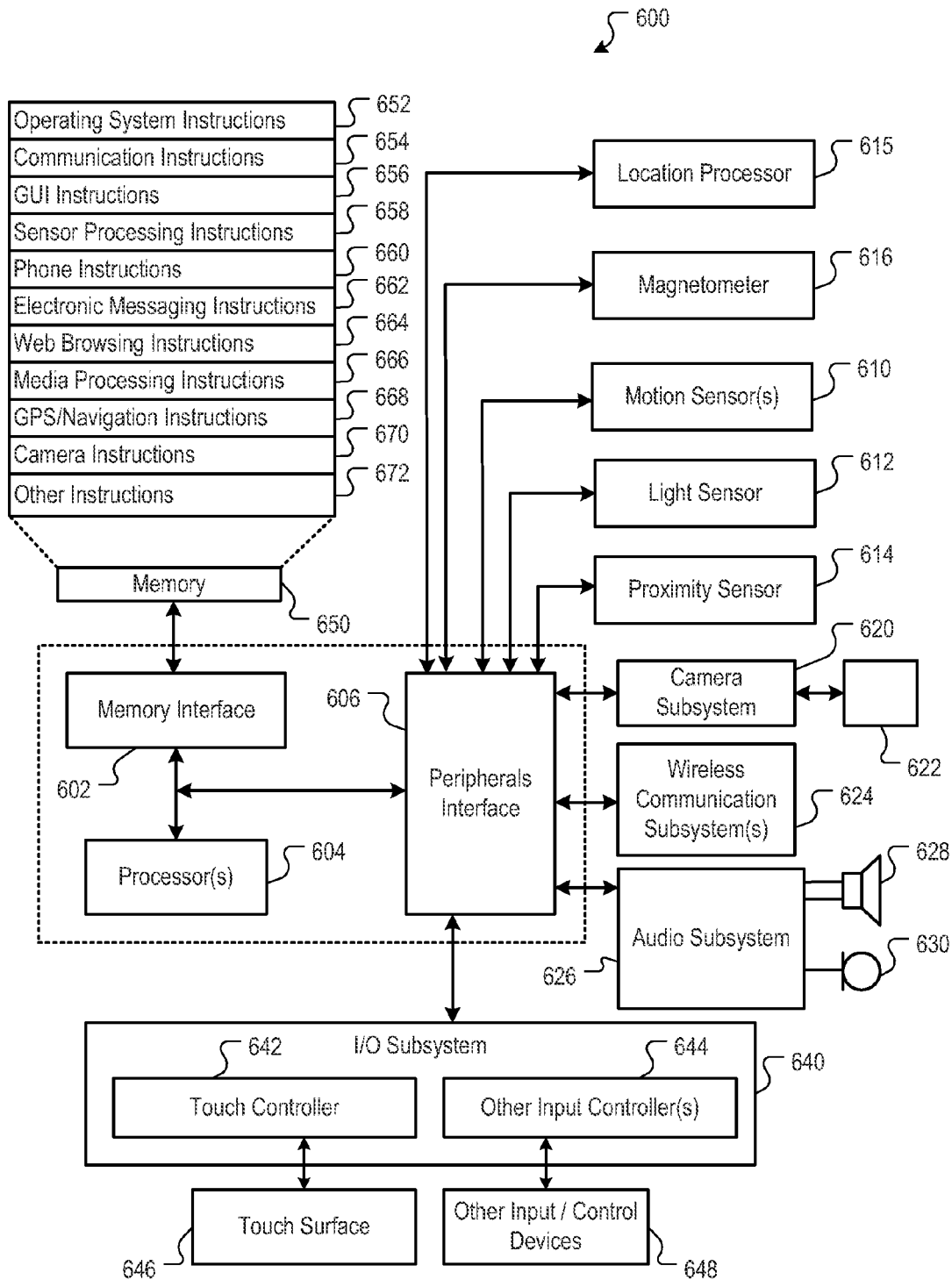
FIG. 6 is a block diagram of an exemplary architecture of a location-aware device capable of implementing the features and processes described in reference to FIGS. 1-5.

FIG. 6 is a block diagram of an exemplary architecture of a location-aware device capable of implementing the features and processes described in reference to FIGS. 1-5.

Architecture 600 may be implemented in any device for generating the features described in reference to FIGS. 1-5, including but not limited to portable or desktop computers, smart phones and electronic tablets, television systems, game consoles, kiosks and the like. Architecture 600 may include memory interface 602, data processor(s), image processor(s) or central processing unit(s) 604, and peripherals interface 606. Memory interface 602, processor(s) 604 or peripherals interface 606 may be separate components or may be integrated in one or more integrated circuits. One or more communication buses or signal lines may couple the various components.

Sensors, devices, and subsystems may be coupled to peripherals interface 606 to facilitate multiple functionalities. For example, motion sensor 610, light sensor 612, and proximity sensor 614 may be coupled to peripherals interface 606 to facilitate orientation, lighting, and proximity functions of the device. For example, in some implementations, light sensor 612 may be utilized to facilitate adjusting the brightness of touch surface 646. In some implementations, motion sensor 610 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 606, such as a temperature sensor, a biometric sensor, or other sensing device, to facilitate related functionalities.

Location processor 615 (e.g., GPS receiver) may be connected to peripherals interface 606 to provide geo-positioning. Electronic magnetometer 616 (e.g., an integrated circuit chip) may also be connected to peripherals interface 606 to provide data that may be used to determine the direction of magnetic North. Thus, electronic magnetometer 616 may be used as an electronic compass.

Camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 624. Communication subsystem(s) 624 may include one or more wireless communication subsystems. Wireless communication subsystems 624 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 624 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, and a Bluetooth™ network. Communication subsystems 624 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 626 may be coupled to a speaker 628 and one or more microphones 630 to facilitate voice-enabled functions, such as voice recognition, voice replication, digital recording, and telephony functions.

I/O subsystem 640 may include touch controller 642 and/or other input controller(s) 644. Touch controller 642 may be coupled to a touch surface 646. Touch surface 646 and touch controller 642 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 646. In one implementation, touch surface 646 may display virtual or soft buttons and a virtual keyboard, which may be used as an input/output device by the user.

Other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of speaker 628 and/or microphone 630.

In some implementations, device 600 may present recorded audio and/or video files, such as MP3, AAC, and MPEG files. In some implementations, device 600 may include the functionality of an MP3 player and may include a pin connector for tethering to other devices. Other input/output and control devices may be used.

Memory interface 602 may be coupled to memory 650. Memory 650 may include high-speed random access memory or non-volatile memory, such as one or more magnetic disk storage devices, one or more optical storage devices, or flash memory (e.g., NAND, NOR). Memory 650 may store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 may include a kernel (e.g., UNIX kernel).

Memory 650 may also store communication instructions 654 to facilitate communicating with one or more additional devices, one or more computers or servers. Communication instructions 654 may also be used to select an operational mode or communication medium for use by the device, based on a geographic location (obtained by the GPS/Navigation instructions 668) of the device. Memory 650 may include graphical user interface instructions 656 to facilitate graphic user interface processing, including a touch model for interpreting touch inputs and gestures; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes; camera instructions 670 to facilitate camera-related processes and functions; and other instructions 672 for facilitating other processes, features and applications, such as the features and processes described in reference to FIGS. 1-5.

Each of the above identified instructions and applications may correspond to a set of instructions for performing one or more functions described above. These instructions need not be implemented as separate software programs, procedures, or modules. Memory 650 may include additional instructions or fewer instructions. Furthermore, various functions of the device may be implemented in hardware and/or in software, including in one or more signal processing and/or application specific integrated circuits.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

A number of implementations have been described. Nevertheless, it will be understood that various modifications may be made. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, at a first device, input specifying a route with a departure location, a departure date, a destination location and one or more intermediate locations;
   receiving, at the first device, input specifying regions around the departure location, the destination location and the one or more intermediate locations;
   receiving a request to allow monitoring of the first device by a second device;
   sending an acceptance of the request to the second device;
   determining that the departure date has arrived;
   in response to determining that the departure date has arrived, automatically monitoring for an exit event of the first device out of one of the specified regions around the departure location region;
   and sending a notification to the second device in response to detecting the exit event, where one or more hardware processors perform the method.

2. The method of claim 1, where receiving input specifying regions includes specifying geo-fences defining the regions.

3. The method of claim 1, where the monitoring includes determining that the first device has deviated from the route based on sensor data collected at the first device.

4. The method of claim 1, where the monitoring includes determining that the first device contacted an emergency service.

5. The method of claim 1, where the monitoring includes determining that the first device has dwelled in a region for an amount of time that exceeds a predetermined dwell time.

6. The method of claim 1, where sending the notification includes sending a map or map data for indicating the current location of the first device on a map displayed on the second device.

7. The method of claim 1, further comprising:
   determining a timestamp associated with the exit event; and
   sending data including the timestamp to the second device.

8. The method of claim 7, where sending the data includes sending the data by way of a location-based service.

9. A method comprising:
   sending, from a first device, a request to monitor a second device on a departure date while the second device is en route to a destination;
   receiving, by the first device, acceptance of the request;
   determining that the departure date has arrived;
   receiving, by the first device on the departure date, a first event notification from the second device that the second device has exited the departure region;
   in response to receiving the first notification on the departure date, automatically initiating monitoring of the second device in response to the first event notification; and
   receiving,
   during monitoring, a second event notification indicating that the second device has entered or exited a region specified by the first device, wherein the method is performed by one or more hardware processors.

10. The method of claim 9, where receiving the first or second notification includes receiving a map or map data for indicating the current location of the second device on a map displayed on the first device.

11. A system comprising:
one or more processors; memory coupled to the one or more processors and configured for storing instructions, which, when executed by the one or more processors, causes the one or more processors to perform operations comprising:
receiving, at a first device, input specifying a route with a departure location, a departure date, a destination location and one or more intermediate locations;
receiving, at the first device, input specifying regions around the departure location, the destination location and the one or more intermediate locations;
receiving a request to allow monitoring of the first device by a second device; sending an acceptance of the request to the second device; determining that the departure date has arrived;
in response to determining that the departure date has arrived, automatically monitoring for an exit event of the first device out of one of the specified regions around the departure location region; and sending a notification to the second device in response to detecting the exit event.

12. The system of claim 11, where receiving input specifying regions includes specifying geo-fences defining the regions.

13. The system of claim 11, where the monitoring includes determining that the first device has deviated from the route based on sensor data collected at the first device.

14. The system of claim 11, where the monitoring includes determining that the first device contacted an emergency service.

15. The system of claim 11, where the monitoring includes determining that the first device has dwelled in a region for an amount of time that exceeds a predetermined dwell time.

16. The system of claim 11, where sending the notification includes sending a map or map data for indicating the current location of the first device on a map displayed on the second device.

17. The system of claim 11, where the operations further comprise:
determining a timestamp associated with the exit; and
sending data including the timestamp to the second device.

18. The system of claim 17, where sending the data includes sending the data by way of a location-based service.

19. A system comprising:
one or more processors; memory coupled to the one or more processors and configured for storing instructions, which, when executed by the one or more processors, causes the one or more processors to perform operations comprising:
sending, from a first device, a request to monitor a second device on a departure date while the second device is en route to a destination;
receiving, by the first device, acceptance of the request;
determining that the departure date has arrived;
receiving, by the first device on the departure date, a first event notification from the second device that the second device has exited the departure region;
in response to receiving the first notification on the departure date, automatically initiating monitoring of the second device in response to the first event notification; and
receiving, during monitoring, a second event notification indicating that the second device has entered or exited a region specified by the first device.

20. The system of claim 19, where receiving the first or second notification includes receiving a map or map data for indicating the current location of the second device on a map displayed on the first device.

* * * * *

UNITED STATES PATENT AND TRADEMARK OFFICE
CERTIFICATE OF CORRECTION

| | |
|---|---|
| PATENT NO. | : 9,173,061 B2 |
| APPLICATION NO. | : 13/717566 |
| DATED | : October 27, 2015 |
| INVENTOR(S) | : Devrim Varoglu and Swapnil R. Dave |

It is certified that error appears in the above-identified patent and that said Letters Patent is hereby corrected as shown below:

Claims

Column 10, Line 22; In Claim 1, delete "location region;" and insert -- location; --, therefor.

Column 11, Line 20; In Claim 11, delete "location region;" and insert -- location; --, therefor.

Signed and Sealed this
Tenth Day of May, 2016

Michelle K. Lee
*Director of the United States Patent and Trademark Office*